United States Patent [19]

Ritter, Jr.

[11] 4,034,621

[45] July 12, 1977

[54] BEVEL GEAR DRIVE ASSEMBLY

[75] Inventor: Arthur J. Ritter, Jr., Metamora, Ill.

[73] Assignee: Caterpillar Tractor Co., Peoria, Ill.

[21] Appl. No.: 652,263

[22] Filed: Jan. 26, 1976

Related U.S. Application Data

[63] Continuation of Ser. No. 410,603, Oct. 29, 1973, abandoned.

[51] Int. Cl.² .................... F16H 1/20; F16H 1/40
[52] U.S. Cl. .................... 74/424; 74/417; 74/713
[58] Field of Search .............. 74/665 GC, 713, 714, 74/417, 423, 424, 431, 710

[56] References Cited

U.S. PATENT DOCUMENTS

| | | | |
|---|---|---|---|
| 2,862,458 | 12/1958 | Lewis | 74/417 X |
| 2,903,973 | 9/1959 | Lewis | 74/423 X |
| 3,194,083 | 7/1965 | Ballard | 74/431 |
| 3,364,791 | 1/1968 | Truckle | 74/711 |
| 3,442,444 | 5/1969 | Kievit | 74/417 X |

*Primary Examiner*—Samuel Scott
*Assistant Examiner*—Lance W. Chandler
*Attorney, Agent, or Firm*—Phillips, Moore, Weissenberger, Lempio & Majestic

[57] ABSTRACT

A bevel gear drive assembly for driving a track-type vehicle. The assembly is arranged and mounted within a casing such that thrust loads due to the natural separating forces between the various gears of the assembly are neutralized. The casing components are not exposed to an imbalance of forces.

2 Claims, 1 Drawing Figure

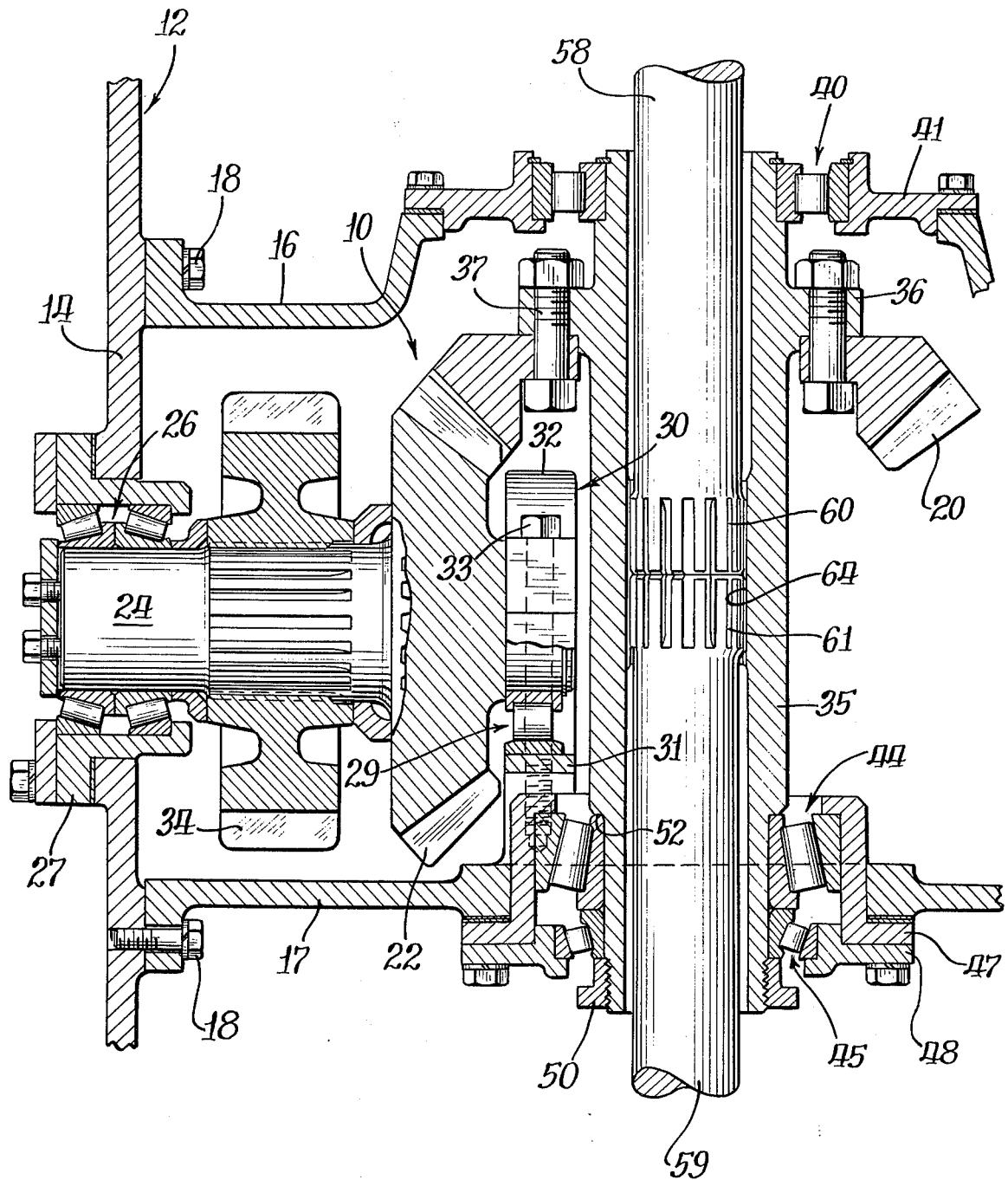

BEVEL GEAR DRIVE ASSEMBLY

This is a continuation of Ser. No. 410,603, filed Oct. 29, 1973 now abandoned.

BACKGROUND OF THE INVENTION

Conventional bevel gear casings for track-type earthmoving vehicles are usually divided into three compartments by means of a pair of centrally disposed laterally spaced walls. The central compartment formed by such walls usually contains a bevel gear and a shaft therefor which has end portions extending axially through such walls into oppositely disposed outer compartments. Within the central compartment, the main bevel gear meshes with another bevel gear, conveniently referred to as a bevel pinion, which is driven by the vehicle transmission for imparting driving torque to the bevel gear shaft. The axially opposite ends of the bevel gear shaft are usually operatively connected to left and right track steering clutches and brakes which are individually disposed within the opposed outer compartments. Such steering clutches and brakes are, in turn, coupled to their respective final drives for driving the opositely disposed tracks of the vehicle.

Conventionally, a pair of tapered roller bearings are mounted individually within the laterally spaced central walls of the casing for rotatably supporting the opposite ends of the bevel gear shaft and for absorbing the usually high axial thrust loads caused by the natural tendency for the bevel gear and pinion to separate during meshing. Such separating is caused by a component of the driving force being transmitted between the bevel gear and pinion due to the pressure angle of such a force, as well known in the art. This separating force causes one or the other of the tapered roller bearings to run under high loading and for the oppositely disposed tapered roller bearing to run lightly loaded.

Such an imbalance in loading can cause deflection in the casing walls which could result in a premature failure of the bearing or wall components.

Some examples of the prior art bevel gear mounting arrangements are found in U.S. Pat. Nos. 1,033,102, 1,937,950, 3,194,083, 3,364,791, and 3,442,444 to Huff, Ford, Ballard, Truckle and Kievit respectively.

SUMMARY AND OBJECTS OF THE INVENTION

The instant invention provides a bevel gear assembly having a gear shaft mounting arrangement which neutralizes thrust loading caused by the tendency for the gears of such assembly to separate during meshing. THe bevel gear casing may be made of lighter and more economically manufactured structure because of such thrust neutralization. The bevel pinion of the assembly is so arranged with respect to the bevel gear that the thrust forces generated thereby will balance those developed by the bevel gear.

The main object of the present invention is to provide a bevel gear drive assembly wherein the bevel gear and the bevel pinion are mounted at adjacent positions with respect to opposite walls of the bevel gear assembly casing so that equal and opposite thrust loads from both the bevel gear and bevel pinion are exerted upon the walls in equal and opposite directions.

Other objects and advantages of the present invention will become apparent from the following description of the drawing.

BRIEF DESCRIPTION OF THE DRAWING

The sole FIGURE in the drawing is a sectional elevation of a bevel gear drive casing showing the operative parts mounted within a centrally disposed compartment and embodying the principles of the present invention.

DETAILED DESCRIPTION

With reference to the drawing, the instant bevel gear drive assembly is indicated generally at 10. The assembly is mounted within a casing 12 which includes a first structural wall 14 and a pair of laterally extending opposite second and third walls 16 and 17 which are attached to the first wall by suitable means such as bolts 18 or the like.

The drive assembly 10 includes a bevel gear 20 which meshes with a bevel pinion 22. THe bevel pinion is integrally formed with a shaft 24. One end of the shaft 24 is rotatably journalled within a double tapered roller bearing assembly 26 which assembly is mounted within a bearing cage 27 fixed to the first wall 14. The other end of the shaft 24 is supported within a roller bearing 29 which bearing is mounted within a bearing support assembly 30. Such support assembly includes a base member 31 which extends from the third wall 17 and which is integrally formed therewith. A bearing clamp 32 is secured to the base 31 by means of bolts 33 or the like to retain the bearing and shaft in operative position.

A quill shaft 35 extends between the second and third walls 16 and 17. This quill shaft is provided with an annular flange 36 at one end thereof for mounting the teeth structure of bevel gear 20 thereupon by means of bolts 37. The end of the shaft upon which the bevel gear 20 is disposed is rotatably journalled within a straight roller bearing 40 which is carried by a bearing cage 41 fixed to the wall 16 by appropriate fastening means. The opposite end of the quill shaft 35 is rotatably journalled within a large tapered roller bearing 44 and a smaller tapered roller bearing 45. THe bearings 44 and 45 are mounted respectively within bearing cages 47 and 48 which are fixed to the wall 17 by appropriate fastening means.

A lock nut 50 is threadably mounted upon the quill shaft 35 as shown. This lock nut secures the bearings 44 and 45 between itself and an annular shoulder 52 formed on the quill shaft. With this arrangement, axial thrust loads imparted to the quill shaft are transmitted through the bearings 44 and 45 to the third wall 17.

THe outwardly extending shaft end portions 58 and 59 for the respective track final drive assemblies are provided with externally splined ends 60 and 61 which abut within the hollow interior of the quill shaft 35 and mate with an internal spline connection 64 formed within the quill shaft.

Power transmission through the bevel gear drive assembly produces a separating force between the teeth of the bevel gear 20 and bevel pinion 22 which force tends to load the shafts of both members. With the apparatus as disposed in the drawing, an upwardly directed axial thrust load would be exerted on the bevel gear 20 and would be transmitted by the quill shaft 35 to the underside of the wall 17 to exert an upwardly directed force upon the tapered roller bearing 44 and the bearing cage 47.

A downwardly directed equal and opposite thrust load would be exerted by the bevel pinion 22 and would be transmitted through the roller bearing 29 and support assembly 30 upon the upper portion of the third wall 17 which force would substantially cancel the upwardly directed axial force exerted by the bevel gear shaft 35. Thus, the summation of forces exerted upon the third wall 17 and the second wall 16 would be substantially zero and such walls would not tend to deflect.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. A bevel gear drive assembly comprising:
   a casing having a first wall, a second wall and a third wall, said second and third walls extending substantially normally from said first wall and in a substantially parallel relationship;
   a quill shaft extending between said second and third walls;
   shaft means drivingly engaging said quill shaft;
   a pinion shaft rotatably supported adjacent a first end thereof in said first wall and extending normally therefrom to a second end thereof adjacent said quill shaft;
   a beveled pinion gear drivingly mounted on said pinion shaft distal said first wall;
   a bevel gear drivingly associated with said quill shaft and intermeshing with said beveled pinion gear;
   tapered bearing means for rotatably supporting said pinion shaft in said first wall;
   first bearing means for rotatably supporting said quill shaft in said second wall;
   a pinion shaft support assembly including second bearing means proximate said quill shaft for rotatably supporting said second end of said pinion shaft;
   and,
   a quill shaft support assembly removably fixedly associated with said third wall including third bearing means for rotatably supporting said quill shaft;
   said second bearing means transmitting dynamic forces exerted by said pinion shaft to said third wall in a first direction and said third bearing means transmitting dynamic forces exerted by said quill shaft to said third wall in a second opposite direction.

2. The bevel gear assembly of claim 1 wherein said first bearing means comprises a second wall bearing cage and a roller bearing assembly, said roller bearing assembly fixedly retained in said bearing cage for rotatably supporting said quill shaft.

* * * * *